United States Patent
Shafer et al.

(10) Patent No.: US 10,277,305 B1
(45) Date of Patent: *Apr. 30, 2019

(54) UAV WILDLIFE MONITORING SYSTEM AND RELATED METHODS

(71) Applicant: Arizona Board of Regents acting for and on behalf of Northern Arizona University, Flagstaff, AZ (US)

(72) Inventors: Michael W. Shafer, Flagstaff, AZ (US); Paul G. Flikkema, Flagstaff, AZ (US); Joseph Davidson, Flagstaff, AZ (US)

(73) Assignee: Arizona Board of Regents acting for and on behalf of Northern Arizona University, Flagstaff, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/966,371

(22) Filed: Apr. 30, 2018

Related U.S. Application Data

(63) Continuation of application No. 15/489,604, filed on Apr. 17, 2017, now Pat. No. 9,979,463.

(Continued)

(51) Int. Cl.
*H04B 7/185* (2006.01)
*G01S 5/02* (2010.01)
(Continued)

(52) U.S. Cl.
CPC ........ *H04B 7/18504* (2013.01); *A01K 11/006* (2013.01); *A01K 29/005* (2013.01); *A01M 31/002* (2013.01); *B64C 39/024* (2013.01); *G01S 5/0252* (2013.01); *G05D 1/0038* (2013.01); *G05D 1/0044* (2013.01); *H04B 1/0343* (2013.01); *H04B 1/10* (2013.01); *B64C 2201/12* (2013.01); *B64C 2201/146* (2013.01); *B64C 2201/203* (2013.01)

(58) Field of Classification Search
None
See application file for complete search history.

(56) References Cited

U.S. PATENT DOCUMENTS

| | | |
|---|---|---|
| 9,471,059 B1 | 10/2016 | Wilkins |
| 2003/0052823 A1* | 3/2003 | Carroll .................. G01S 5/0081 342/465 |

(Continued)

*Primary Examiner* — Mohammed Rachedine
(74) *Attorney, Agent, or Firm* — IPTechLaw

(57) ABSTRACT

Implementations of UAV wildlife monitoring system may include a ground control station wirelessly coupled to a UAV which may include a flight controller, a first radio, a second radio, a first antenna, a second antenna, a very high frequency (VHF) radio receiver, and a computer, all operatively coupled together. The monitoring system may also include a VHF tag configured to be coupled to an animal, wherein when the VHF tag is coupled to the animal, the VHF radio receiver receives a VHF radio signal from the VHF tag using the first antenna, wherein the computer process the VHF radio signal to create the location data from the VHF radio signal, processes the location data, and sends the location data to the second radio, wherein the second radio transmits the location data into a telecommunications channel, and wherein the ground control station receives the location data from the telecommunications channel.

20 Claims, 10 Drawing Sheets

Related U.S. Application Data

(60) Provisional application No. 62/323,629, filed on Apr. 16, 2016.

(51) Int. Cl.
*H04B 1/034* (2006.01)
*B64C 39/02* (2006.01)
*G05D 1/00* (2006.01)
*H04B 1/10* (2006.01)
*A01K 11/00* (2006.01)
*A01K 29/00* (2006.01)
*A01M 31/00* (2006.01)

(56) References Cited

U.S. PATENT DOCUMENTS

| | | | |
|---|---|---|---|
| 2005/0007278 A1* | 1/2005 | Anson | G01S 3/48 342/451 |
| 2012/0115241 A1 | 5/2012 | Ho et al. | |
| 2013/0070677 A1 | 3/2013 | Chang | |
| 2015/0301155 A1 | 10/2015 | Roisen et al. | |
| 2017/0024846 A1 | 1/2017 | Nash et al. | |
| 2017/0295609 A1* | 10/2017 | Darrow | H04W 84/18 |

* cited by examiner

UAV WILDLIFE MONITORING SYSTEM AND RELATED METHODS

CROSS REFERENCE TO RELATED APPLICATIONS

This application is a continuation application of the earlier U.S. Utility Patent Application to Shafer entitled "UAV Wildlife Monitoring System and Related Methods," application Ser. No. 15/489,604, filed Apr. 17, 2017, which application claims the benefit of the filing date of U.S. Provisional Patent Application 62/323,629, entitled "UAV Wildlife Monitoring System and Related Methods" to Shafer which was filed on Apr. 16, 2016, the disclosure of which is hereby incorporated entirely herein by reference.

GOVERNMENT LICENSE RIGHTS

This invention was made with government support under Award 1556417 awarded by the National Science Foundation. The government has certain rights in the invention.

BACKGROUND

1. Technical Field

Aspects of this document relate generally to wildlife tracking, detection, and monitoring systems. More specific implementations involve systems utilizing very high frequency (VHF) tags to track, monitor, and detect wildlife.

2. Background

Conventionally, wildlife tracking using tags or transmitters to monitor and detect wildlife has been done to monitor and study different species of wildlife. In instances where a VHF tag or transmitter is used, a user must be somewhat near the transmitter or in line of sight with the transmitter to receive any data.

SUMMARY

Implementations of unmanned aerial vehicle (UAV) wildlife monitoring system may include a ground control station wirelessly coupled to a UAV which may include a flight controller, a first radio, a second radio, a first antenna, a second antenna, a very high frequency (VHF) radio receiver, and a computer, all operatively coupled together. The monitoring system may also include a VHF tag configured to be coupled to an animal, wherein when the VHF tag is coupled to the animal, the VHF radio receiver receives a VHF radio signal from the VHF tag received by the first antenna, wherein the computer generates location data from the VHF radio signal received by the VHF radio receiver, processes the location data, and sends the location data to the second radio, wherein the second radio transmits the location data into a telecommunications channel, wherein the ground control station receives the location data from the telecommunications channel, and wherein the ground control station is configured to one of log and display on a screen associated with the ground control station the location data of the animal.

Implementations of the monitoring system may include one, all, or any of the following:

The monitoring system may include a remote controller, wherein the flight controller receives flight commands from the remote controller received through the second antenna.

The flight controller may send flight data relating to a flight path of the UAV to a first radio, wherein the first radio transmits the flight data to the ground control station.

The computer may receive flight data relating to a flight path of the UAV from the flight controller.

The UAV may be collapsible through folding.

The ground control station may include one of a tablet and a smart phone.

The VHF radio receiver may be configured to combine multiple radio pulses received from the VHF tag to improve a signal-to-noise ratio of the VHF radio signal from the VHF tag.

The VHF radio receiver may be configured to create a 3D map of strengths of VHF signals received from the VHF tag.

Implementations of unmanned aerial vehicle (UAV) wildlife monitoring system may include a ground control station wirelessly coupled to a UAV which may include a flight controller, a first radio, a second radio, a first antenna, a second antenna, a software defined radio receiver, a low noise amplifier, and a computer, all operatively coupled together. The monitoring system may also include a VHF tag configured to be coupled to an animal, wherein when the VHF tag is coupled to the animal, the software defined radio receiver receives a VHF radio signal from the VHF tag received by the first antenna and amplified by the low noise amplifier, wherein the computer generates location data from the VHF radio signal received by the software defined radio receiver, processes the location data, and sends the location data to the second radio, wherein the second radio transmits the location data into a telecommunications channel, wherein the ground control station receives the location data from the telecommunications channel, and wherein the ground control station is configured to one of log and display on a screen associated with the ground control station the location data of the animal.

Implementations of the monitoring system may include one, all, or any of the following:

The computer may receive flight data relating to a flight path of the UAV from the flight controller.

The ground control station may include one of a tablet and a smart phone.

The software defined radio receiver may be configured to combine multiple radio pulses received from the VHF tag to improve a signal-to-noise ratio of the VHF radio signal from the VHF tag.

The software defined radio receiver may be configured to create a 3D map of strengths of VHF signals received from the VHF tag.

The software defined radio receiver may be configured to simultaneously detect and monitor multiple VHF tags, each coupled to a different animal.

Implementations of unmanned aerial vehicle (UAV) wildlife monitoring system may include a ground control station wirelessly coupled to a UAV which may include a flight controller, a first radio, a second radio, a first antenna, a second antenna, a software defined radio receiver, a low noise amplifier, and a computer, all operatively coupled together. The monitoring system may also include a VHF tag configured to be coupled to an animal, wherein the software defined radio receiver is configured to simultaneously detect and monitor multiple VHF tags, each coupled to a different animal, wherein when the VHF tag is coupled to the animal, the software defined radio receiver receives a VHF radio signal from the VHF tag received by the first antenna and amplified by the low noise amplifier, wherein the computer generates location data from the VHF radio signal received by the software defined radio receiver, processes the location data, and sends the location data to the second radio, wherein the second radio transmits the location data into a telecommunications channel, wherein the ground control station receives the location data from the telecommunications channel, and wherein the ground control station is configured to one of log and display on a screen associated with the ground control station the location data of the animal.

Implementations of the monitoring system may include one, all, or any of the following:

The software defined radio receiver may be configured to combine multiple radio pulses received form the VHF tag to improve a signal-to-noise ratio of the VHF radio signal from the VHF tag.

The software defined radio receiver may be configured to create a 3D map of strengths of VHF signals received from the VHF tag.

The monitoring system may include a remote controller, wherein the flight controller may receive flight commands from the remote controller received by the second antenna.

The flight controller may send flight data relating to a flight path of the UAV to a first radio, wherein the first radio transmits the flight data to the ground control station.

The monitoring system of claim 15, wherein the computer may receive flight data relating to a flight path of the UAV from the flight controller.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended wildlife detection and monitoring system will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such wildlife detection and monitoring systems, and implementing components and methods, consistent with the intended operation and methods.

Figure 1:
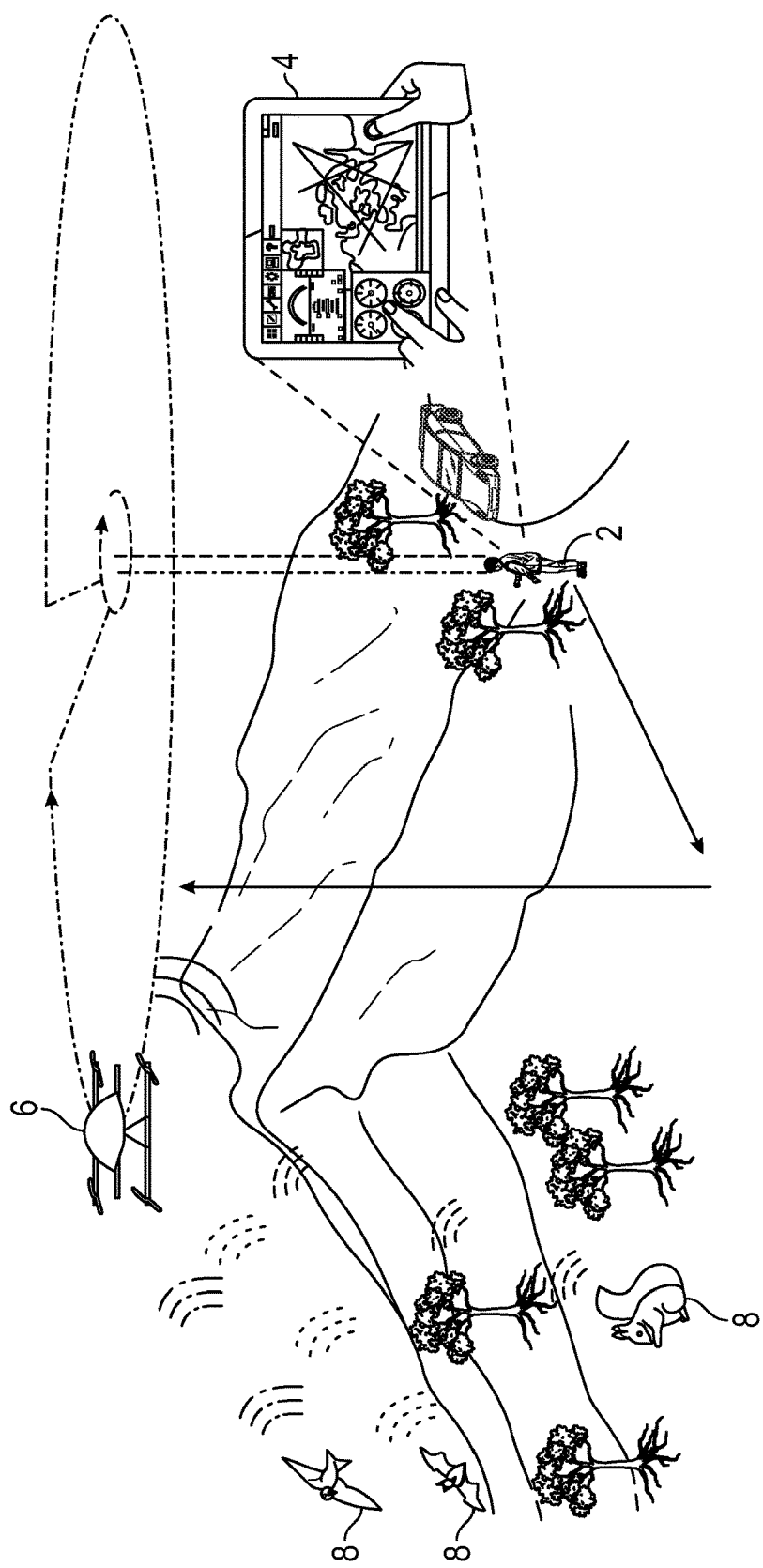
FIG. 1 is a representative example of elements of a UAV wildlife monitoring system.

Referring to FIG. 1, a representative example of elements of a UAV wildlife monitoring system is illustrated. The system may be operated by a user 2. The system may also include a ground control station 4. In various implementations, the user may operate and interact with the ground control station 4 which is operatively coupled with an unmanned aerial vehicle (UAV) 6. In various implementations, during operation, the UAV may hover in an elevated stationary position, essentially acting as a pop-up antenna, while in other implementations the UAV may perform any variety of flight patterns either predetermined by the user and selected by the user using the ground control station or manually or semi-manually guided by the user using the ground control station. The UAV 6 may receive radio signals from tags coupled to animals 8 through one or more antennae including on the UAV. In various implementations, the tags may be very high frequency (VHF) tags.

Figure 2:
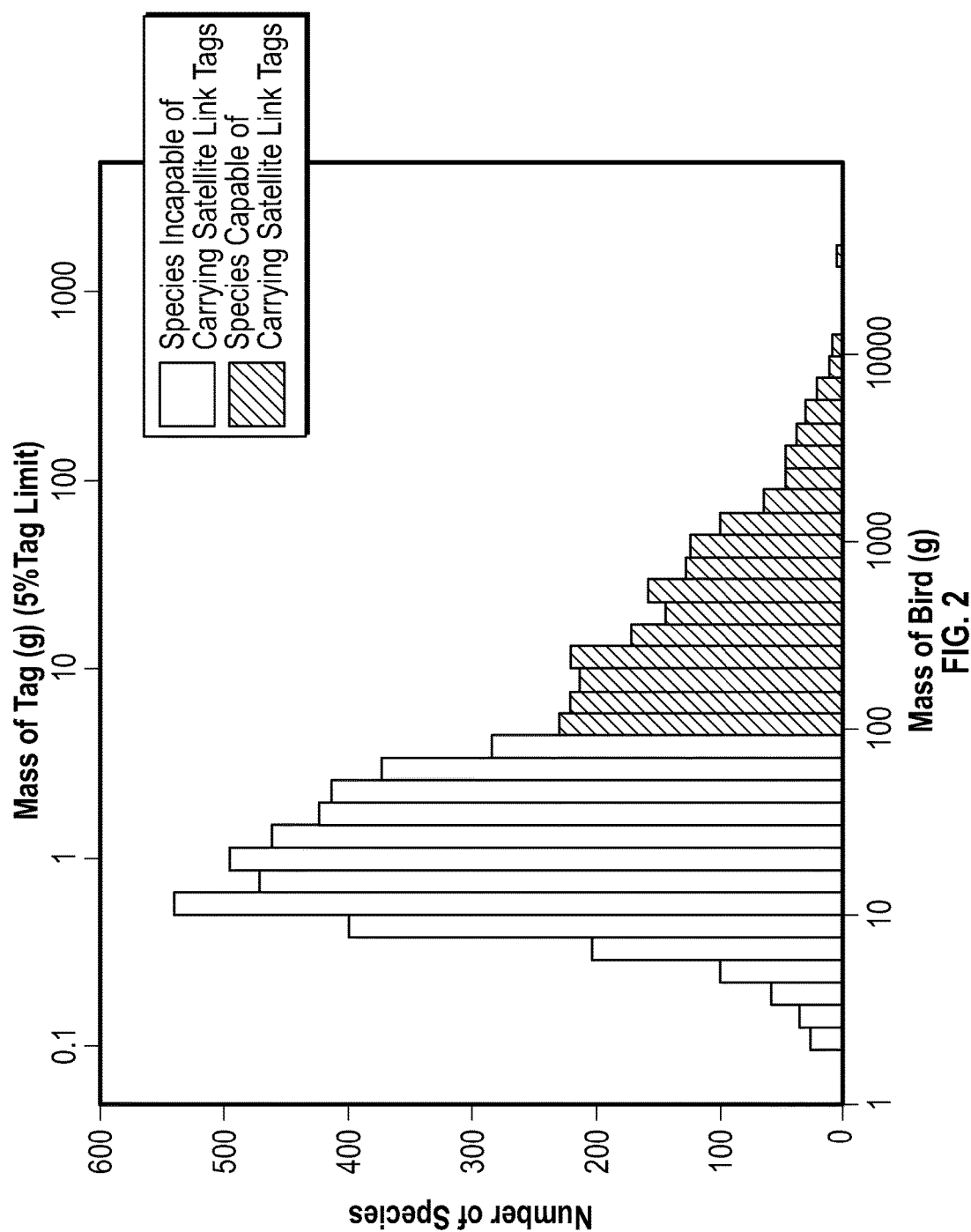
FIG. 2 is a chart showing the number of bird species incapable of using satellite tags.
Figure 3:
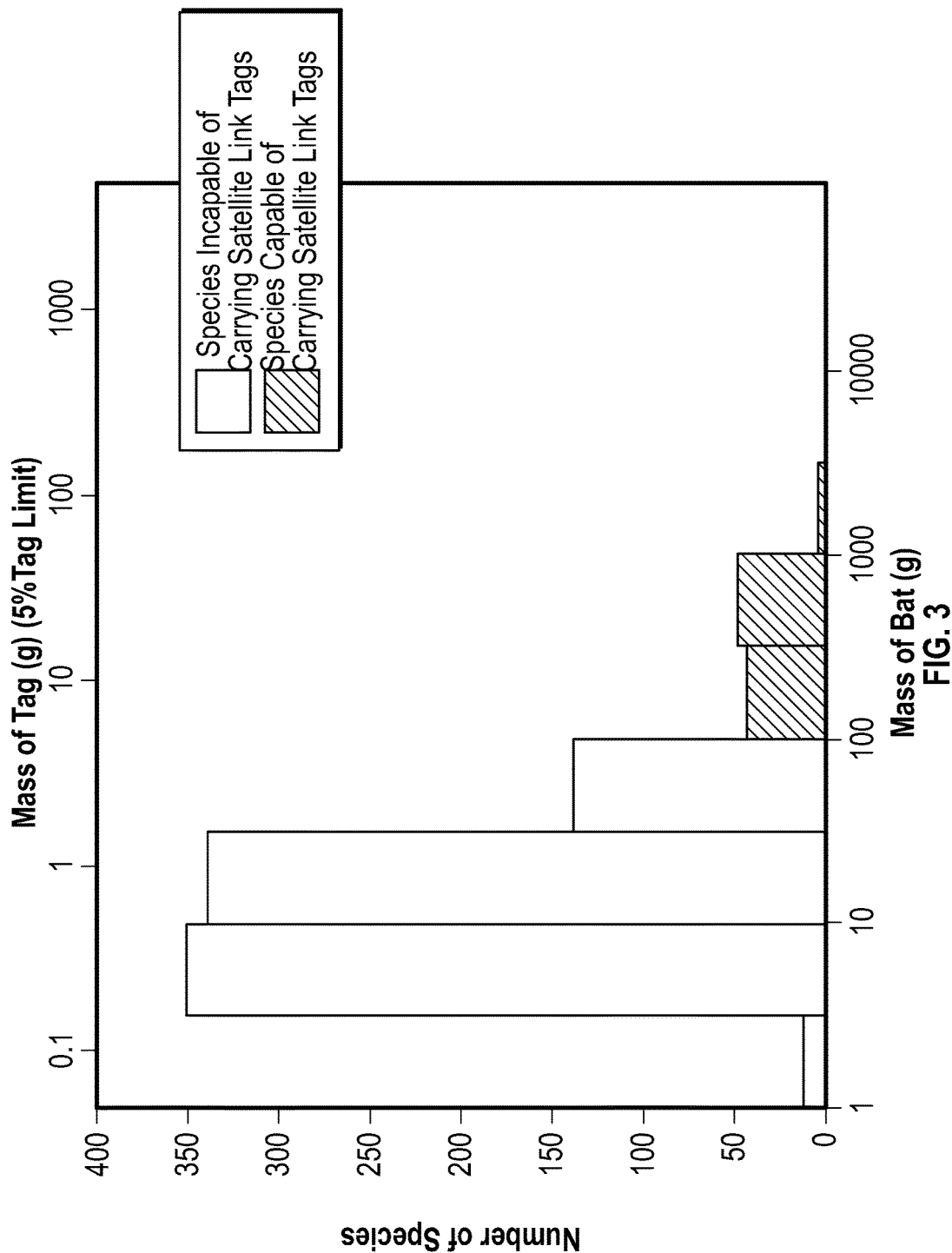
FIG. 3 is a chart showing the number of bat species incapable of using satellite tags.

VHF tags are advantageous over tags that communicate with satellites because VHF tags are smaller in size. In wildlife tracking, there are determined limits on the weight ratio of the tag to the animal based on factors that determine the effect of the tag on the animal's normal activities. For birds and bats, for instance, the tag should not weigh more than 5% of the weight of the animal. This prevents the use of satellite tags on many smaller wildlife species, as the weight of satellite tag is too great. Referring to FIG. 2, a chart showing the number of bird species incapable of using satellite tags is shown. The majority of species of birds weigh less than 100 grams. In turn, this means that majority of species of birds are incapable of carrying a conventional satellite tag. VHF tags, however, may still be used on these smaller species due to the smaller mass of the tag. Referring to FIG. 3, a chart showing the number of bat species incapable of using satellite tags is shown. The majority of species of bats weigh less than 100 grams. In turn, this means that the majority of species of bats are incapable of carrying a satellite tag. VHF tags, like with birds, may then be used for many of these species of bats. Thus, for many small wildlife species, including non-flying animal species, VHF tags/trackers are the optimal tag type.

Figure 4:
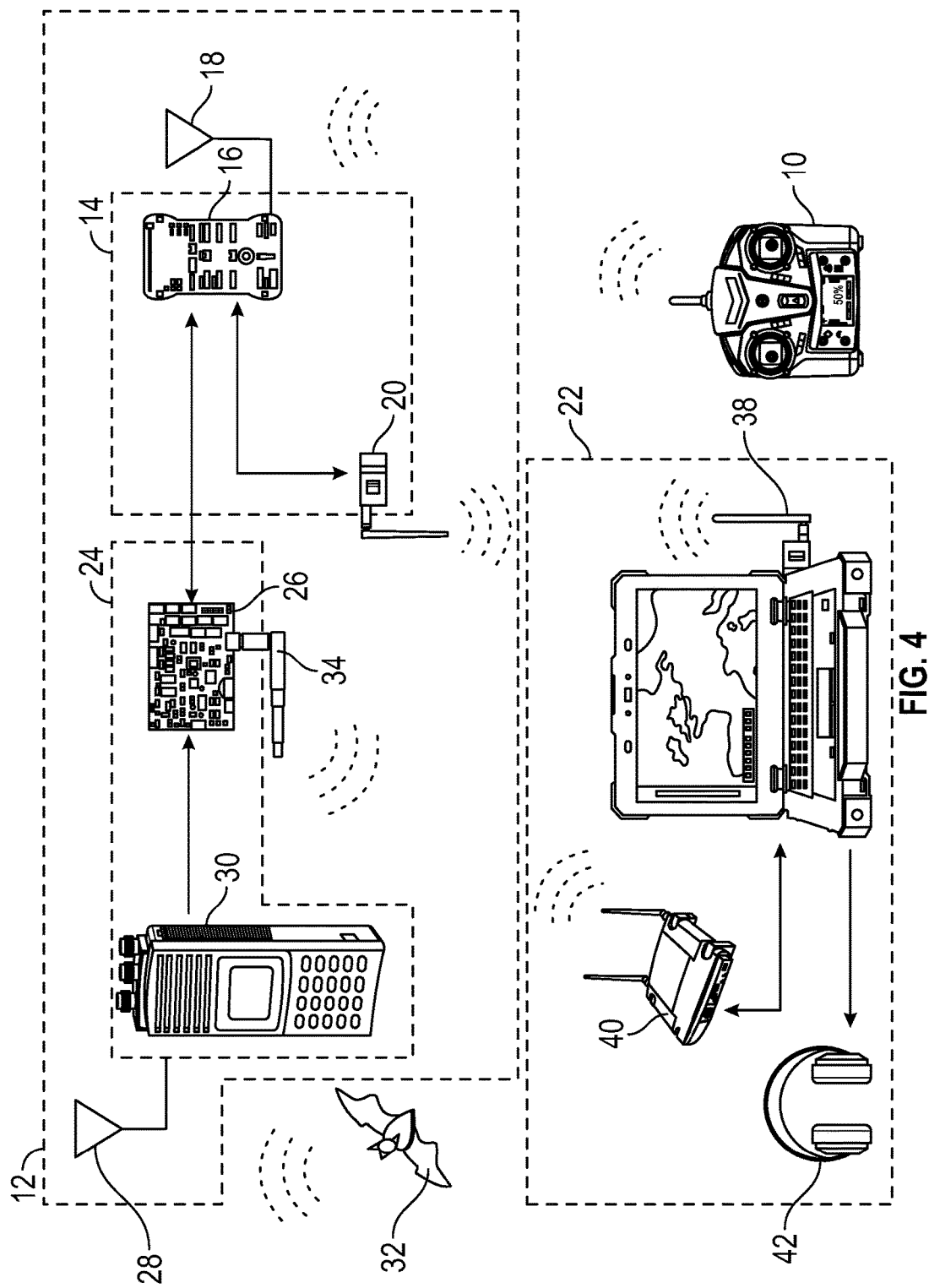
FIG. 4 is a representative example of how elements of FIG. 1 are operatively coupled together physically and through various telecommunication channels.

Referring to FIG. 4, a representative example of how elements of FIG. 1 are operatively coupled together is shown. The system includes a remote controller 10 for operating a UAV 12. The remote controller 10 may be used to wirelessly send flight commands to the UAV. The flight commands may be commands to enable the UAV to take off and land. In other implementations, the flight commands sent from the remote controller may control the entire UAV's flight. In still other implementations, no remote controller may be needed as all flight patterns may be automated and pre-programmed into the UAV. In other implementations, the flight controller 10 may be used to trigger/send pre-programmed flight patterns to the UAV in various implementations. In some implementations, the UAV may be able to operate autonomously/semi-autonomously based on instructions stored in the UAV itself. These may include, by non-limiting example, auto-homing programs, object evasion programs, wind effect compensation programs, and other programs useful to allow the UAV to maintain its safety and/or stability during flight.

The UAV 12 may include a flight avionics portion 14. The Flight Avionics portion, as illustrated in FIG. 4, may have a flight controller 16 and a second antenna 18 for receiving flight commands from the remote controller 10 and/or the ground control station 22. The second antenna may be, by non-limiting example, an H-shaped antenna, a Yagi-type antenna, an omnidirectional antenna, or any antenna design. The flight avionics portion may have a first radio for receiving flight commands from the ground control station 22 and/or communicating flight data (position, speed, bearing, etc.) to the ground control station 22 (among other possible functions including communication system(s) for use in interacting with air traffic control systems).

In various implementations, the flight controller 16 may receive the flight commands from the remote controller 10 of the control ground station 22 through the second antenna to enable the flight controller to control the UAV as commanded by the remote controller. In other implementations, the flight controller 16 may receive the flight commands from the first radio which received flight commands from the ground control station 22 to enable the flight controller to control the UAV as commanded by the ground control station 22.

The UAV 12 may include a science avionics portion 24. The Science Avionics portion 24 may include a computer 26. In various implementations, the computer may be a single board computer. Specifically, in various implementations the computer may be marketed under the tradename RASPBERRY PI by the Raspberry Pi foundation in the United Kingdom. Many possible computer designs are possible, whether single or multi-boarded in various implementations.

The science avionics portion 24 may also include a first antenna 28. The first antenna 28 may be, by non-limiting example, an H-shaped antenna, a Yagi-type antenna, an omnidirectional antenna, a high gain directional antenna, or any other kind of antenna.

The science avionics portion 24 may include a VHF radio receiver 30 and a second radio 34 for communicating acquired and/or processed data with/to the ground control station 22. While the VHF radio receiver 30 is described as a receiver in this document, it is important to note that the VHF radio receiver 30 may also have the ability to act as a transceiver in various implementations.

In various implementations, a VHF tag may be placed on an animal 32. In other implementations, the VHF tag is not placed on an animal but is placed on an individual, a vehicle, or any other device/object to be tracked or monitored. A specific example of such a situation would be using such a VHF tag attached to an individual or snowmobile for detecting them buried in the aftermath of an avalanche.

When the VHF tag is coupled to an animal 32, the VHF radio receiver 30 receives the location data of the animal 32 from the VHF tag as the VHF tag transmits/emits a VHF radio signal. As used in this document, location data may either refer to the radio signal itself from the VHF tag using which the animal's location is determined or the position data obtained by processing from the VHF radio signal. The location data may be calculated by the computer 26, the VHF Radio receiver 30, or both in various implementations. The VHF radio signal is received by the first antenna 28 on the UAV. After receiving the location data, the VHF radio receiver 30 may send the location data/VHF signal characteristics to the computer 26.

The computer 26 then processes the location data/VHF radio signal and sends the location data from the VHF radio signal to the second radio 34. The second radio 34 then may transmit the location data into a telecommunications channel between the UAV and the ground control station 22, allowing the ground control station 22 to receive the location data from the telecommunications channel. In other implementations, the second radio 34 may transmit the location data to another device (computer, table, smart phone) other than the ground control station 22, depending on the nature of the telecommunications channel.

In various implementations the computer 26 may be coupled to the flight controller 16 in a manner that allows for the computer 26 and the flight controller 16 to transfer information to one another. In such implementations, a single radio may be used to transfer the flight data and the location data between the flight controller 16 and the computer 26. In other implementations, the flight controller may be directly electrically coupled with the computer 26 via a wired connection on the UAV itself.

In various implementations the flight avionics portion 14 and the science avionics portion 24 can be combined into a single portion. In still other implementations, the flight controller 16 and the computer 26 may be combined into a single computer.

In various implementations, the VHF radio receiver 30 may be configured to combine multiple received radio pulses from the VHF tag to improve the signal-to-noise ratio (SNR) of the VHF radio signal from the VHF tag. The VHF radio receiver 30 may be configured to combine the radio pulses using coherent or incoherent combining methods. In this way, better accuracy in detecting VHF pulses can be used to improve the location data that can be derived from the pulses.

In various implementations, the VHF radio receiver 30 may be configured to create a 3D map of strengths of VHF signals received from the VHF tag. In such an implementation, the UAV could fly in a regular or irregular pattern that would allow it to map how the environment varies spatially in signal strength. The 3D signal map could be used by the user or ground control station to then infer the signal source origin. In such implementations, the 3D map may allow the user to know a direction in which to move the UAV (or the user) so that a better VHF signal may be obtained.

The monitoring system may include a ground control station 22. In various implementations, the ground control station may include a computer 36. The computer 36 may be, by non-limiting example, a computer, tablet, smartphone, any other personal computing device, or any combination thereof. The computer 36 of the ground control station may log or display on a screen of the computer the location data of the animal. In various implementations, the ground control station may provide additional data processing. In various implementations, the computer will include the remote controller to send flight commands to the UAV.

The ground control station 22 may include a third radio 38. The third radio 38 may be used to transmit flight commands to the first radio and may be used to receive flight data from the first radio. This third radio 38 is one primarily used for the flight process and control of the UAV.

In various implementations, the ground control station 22 may include a WiFi link 40 through the telecommunications channel which is formed using one or more of the 802.11x standards. The WiFi link may transmit information to the second radio 34. The WiFi link may also receive location data, among other data, from the second radio 34 through the telecommunication channel.

In other implementations other communication types may be used in place of the WiFi link. These implementations may utilize a 915 MHZ frequency or other frequencies.

The ground control station 22 may also include a headset 42. The headset may allow a user to listen to the audio associated with the signals sent from the VHF tags. The volume/frequency of the sound in the headset may correspond with one or more characteristics of the VHF signal being received by the antenna(s) on the UAV at the time.

In various implementations the UAV may also include video equipment, such as a camera capable of capturing sequential photographs at a determined frame rate. In such implementations, the UAV may also include an audio/video (AV) transmitter to transmit the stored and/or live video to an AV receiver which may be included as part of the ground control station.

Figure 5:
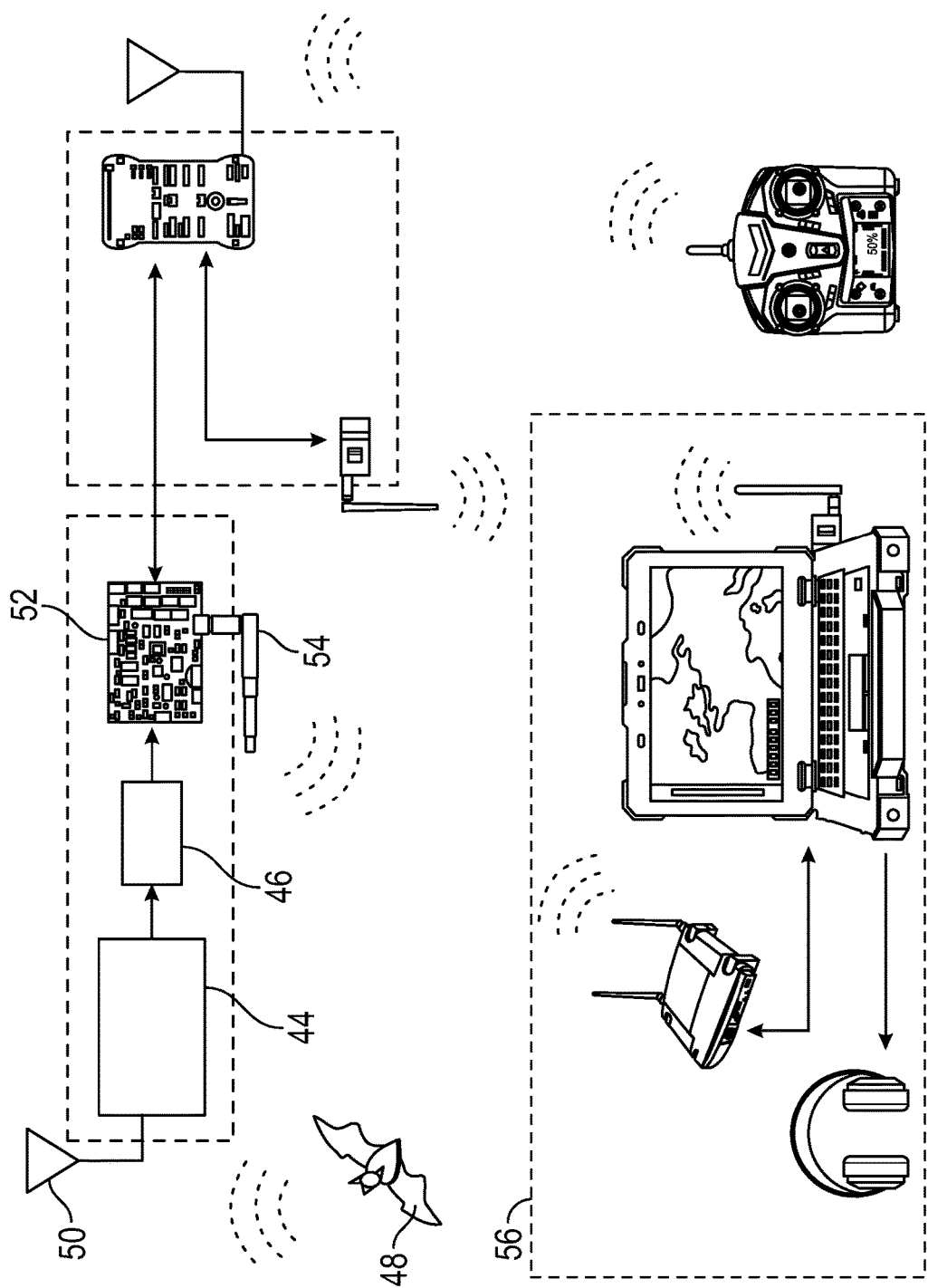
FIG. 5 is an alternative representative example of how elements of FIG. 1 are operatively coupled together physically and through various telecommunication channels.

Referring now to FIG. 5, an alternative representative example of how the elements of FIG. 1 are operatively coupled together is shown. This implementation may be similar to the implementation illustrated in FIG. 4 with the exception that the UAV has no VHF radio receiver, rather, the UAV may have a low noise amplifier and/or a software defined radio. A software defined radio is one whose reception characteristics and/or functions is determined using software rather than solely by hardware components. It may be designed to function as a receiver, transmitter, or transceiver in various implementations.

When the VHF tag is coupled to an animal 48, the software defined radio receiver 30 receives the location data of the animal 48 from the VHF tag that produced a VHF radio signal received by the first antenna 50 and amplifies the VHF radio signal using the low noise amplifier 44. After receiving the location data, the software defined radio receiver 46 sends the location data/VHF signal characteristics to the computer 52.

The computer 52 may process the location data/VHF signal characteristics and send the location data to the second radio 54. The second radio 54 may transmit the location data into a telecommunications channel and the ground control station 56 may receive the location data from the telecommunications channel. As previously disclosed, the second radio 54 may transmit the location data to another device other than the ground control station 56 in various implementations.

In various implementations, the software defined radio receiver 46 may be configured to combine multiple received radio pulses from the VHF tag to improve the signal-to-noise ratio (SNR) of the VHF radio signal from the VHF tag. The software defined radio receiver 46 may be configured to combine the radio pulses using coherent or incoherent combining methods as previously described.

In various implementations, the software defined radio receiver 46 may be configured to create a 3D map of strengths of VHF signals received from the VHF tag. In such an implementation, the UAV could fly in a regular or irregular pattern that would allow it to map how the environment varies spatially in signal strength. The 3D map could be used by the user or ground control station 56 to then infer the signal source origin and/or determine a direction in which to move to obtain a stronger signal.

In various implementations, the software defined radio receiver 46 may be configured to simultaneously detect and monitor multiple VHF tags coupled to multiple animals. The software defined radio receiver may be configured to allow for the continuous observation of a wide bandwidth of frequencies. Such a system would thus have simultaneous detection and monitoring capacity of multiple animals/objects/persons at a time. This may be advantageous when the collective, rather than individual, behavior of a group of animals is being studied.

Figure 6:
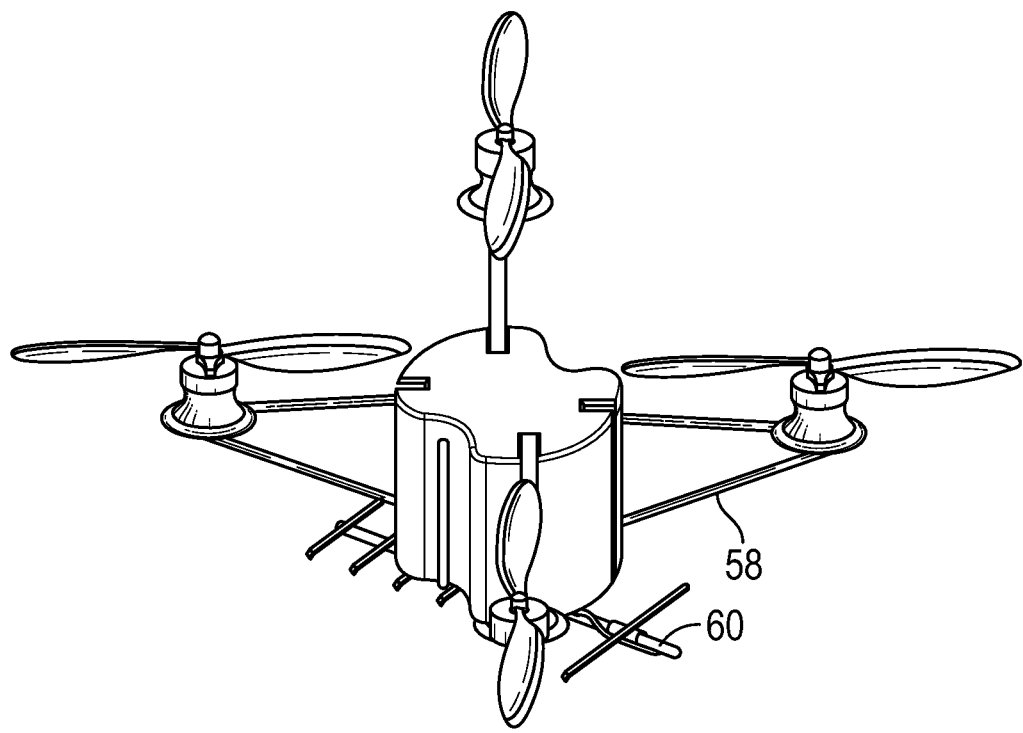
FIG. 6 is a perspective view of a UAV.

Referring to FIG. 6, a perspective view of a UAV is illustrated. UAV 58 may be a quadcopter. In other implementations, UAV 58 may be, by non-limiting example, a fixed-wing plane, a helicopter, hexacopter, octocopter, or any other type of UAV. UAV 58 may be configured to allow for rapid assembly and repair in the field and to shield electromagnetic interference and/or reflection between the monitoring equipment and flight and the flight equipment of the UAV 58.

In various implementations, UAV 58 may include, one, all, or any of the following in various implementations; an audio signal output communicated to the ground control station and/or audio equipment of the user; a flight controller integrated with the telemetry system; a GPS receiver and magnetic compass; a user interface of the ground control station (computing device) providing UAV control, mission planning and visualization of tracking data; fire mitigation features including battery protection against punctures and blunt impacts; vertical/soft landing to minimize impact to batteries; radio link failure contingency for changing UAV flight mode to "return to base" (or return to last known ground control station position) if a radio link with the ground control station is lost; fast recovery in the event of a crash enabled by the radio link between the UAV and ground control station providing live UAV GPS position; a fail-safe parachute system to reduce impact energy of a crash, and material selection for reduced risk of sparks during impact; use of the system in a bearing estimation mode including a pop-up flight mode up to about 150 meters for use as a variable-height virtual pole; a loiter with stepped yaw (LSY) mode where the UAV stabilizes at an operator-set position and then dwells at different stepped compass directions; a 3D scan mode where the UAV uses LSY mode at each corner of a virtual cube; a variable-height LSY mode; a variable-height 3D scan mode; use of the system for pulse detection of multiple tags simultaneously; use of the system in signal-localization mode with an omnidirectional antenna; automated flight mode; and use of the system for wildlife radio tracking. A wide variety of possibilities and features may be included in various UAV implementations.

UAV 58 may include an antenna 60. The antenna may be configured to receive location data from a VHF tag. The antenna may be any type of antenna previously disclosed in this document.

Figure 7:
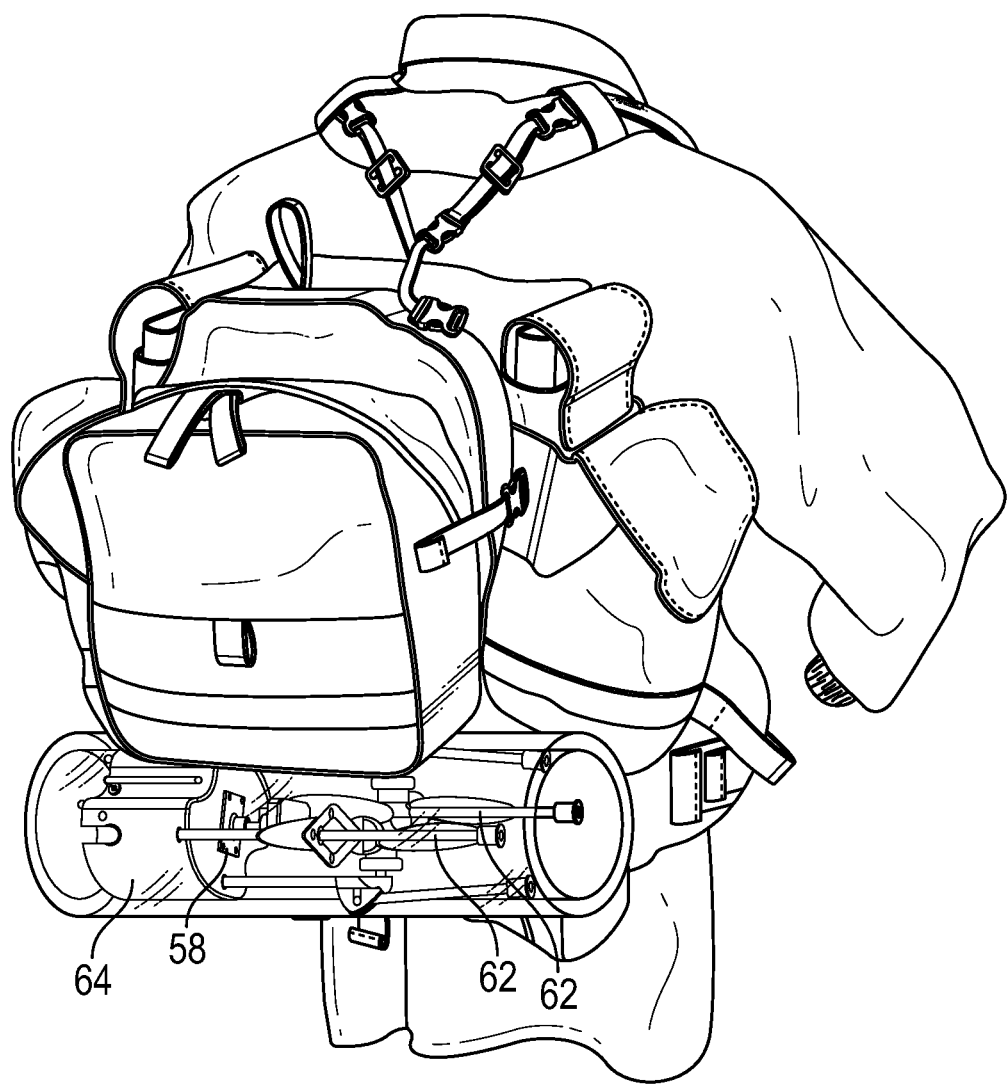
FIG. 7 is a view of the UAV in a collapsed state.

Referring to FIG. 7, a view of the UAV in a collapsed state is illustrated. The UAV 58 may be collapsible by folding the rotor arms 62 up and above the payload area 64. By collapsing the UAV 58 in this manner, transport of the UAV is easily done. Further, the transport can be conducted across difficult conditions, such as strapped to a pack of a user who is hiking over rough terrain.

Figure 8:
FIG. 8 is a view of a map which illustrates the geographical range of signals received by the UAV.

Referring to FIG. 8, a view of a map which illustrates the geographical range of reception of signals received by the UAV is shown. Rough or hilly terrain is often encountered while tracking wild animals, as is shown in the topographic map of FIG. 8. If a user were to stand at a fixed point 66, they would only be able to receive radio signals from animals nearby and within visual range of the antenna or receiver. A transmitter located at a first point 68 and a transmitter located at a second point 70 would not be able to communicate with a receiver at point 66 as terrain would prevent the line-of sight signal from being received. FIG. 8 illustrates the advantage of utilizing a UAV. If a UAV carries the receiver in a flight pattern 72 above the ground, then the first transmitter 68 and the second transmitter 70 would both be able to communicate with the receiver. By utilizing a UAV, the line of sight and range of the signals from the tags to the receiver may be increased. Further, it is beneficial as the user no longer has to hike through the terrain, saving time and money and improving detection and monitoring accuracy. In various implementations the UAV may operate from a few feet off the ground to over 500 feet above the ground.

Figure 9:
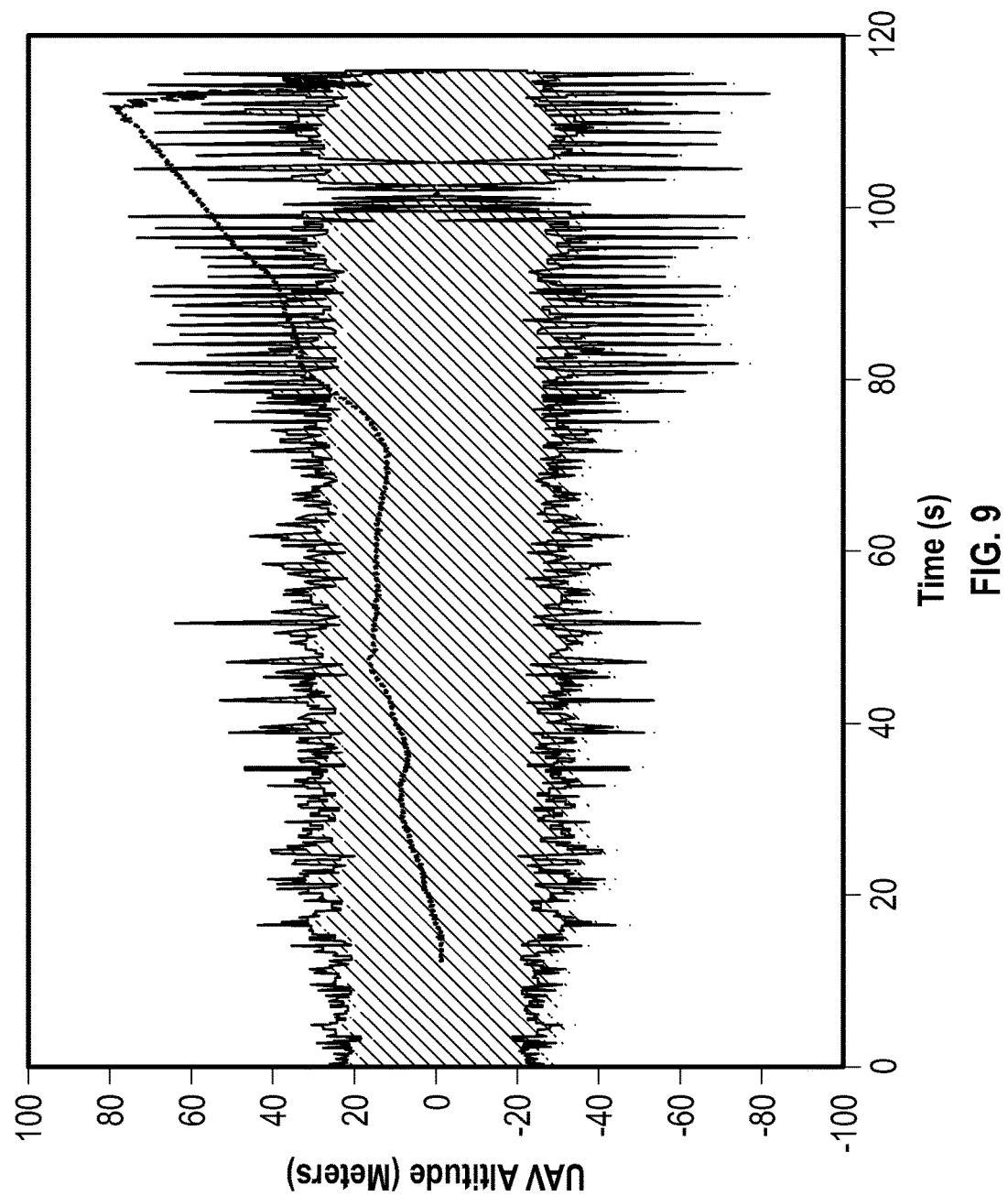
FIG. 9 is a chart showing the relationship between the altitude of an implementation of a UAV and the strength of the signals received.

Referring to FIG. 9, a chart showing the relationship between the altitude of an implementation of a UAV and the strength of the VHF signals received is shown. At ground level, only noise is audible. This continues until the UAV reaches between 10-20 meters, at which point a few pulses become audible. The pulses become very clear at about 30 meters in altitude. The dead spot in the chart at 100 seconds is indicative of the audio signal dropping out. This chart illustrates the increase in observed VHF signal quality as the receiver increases in altitude.

Figure 10:
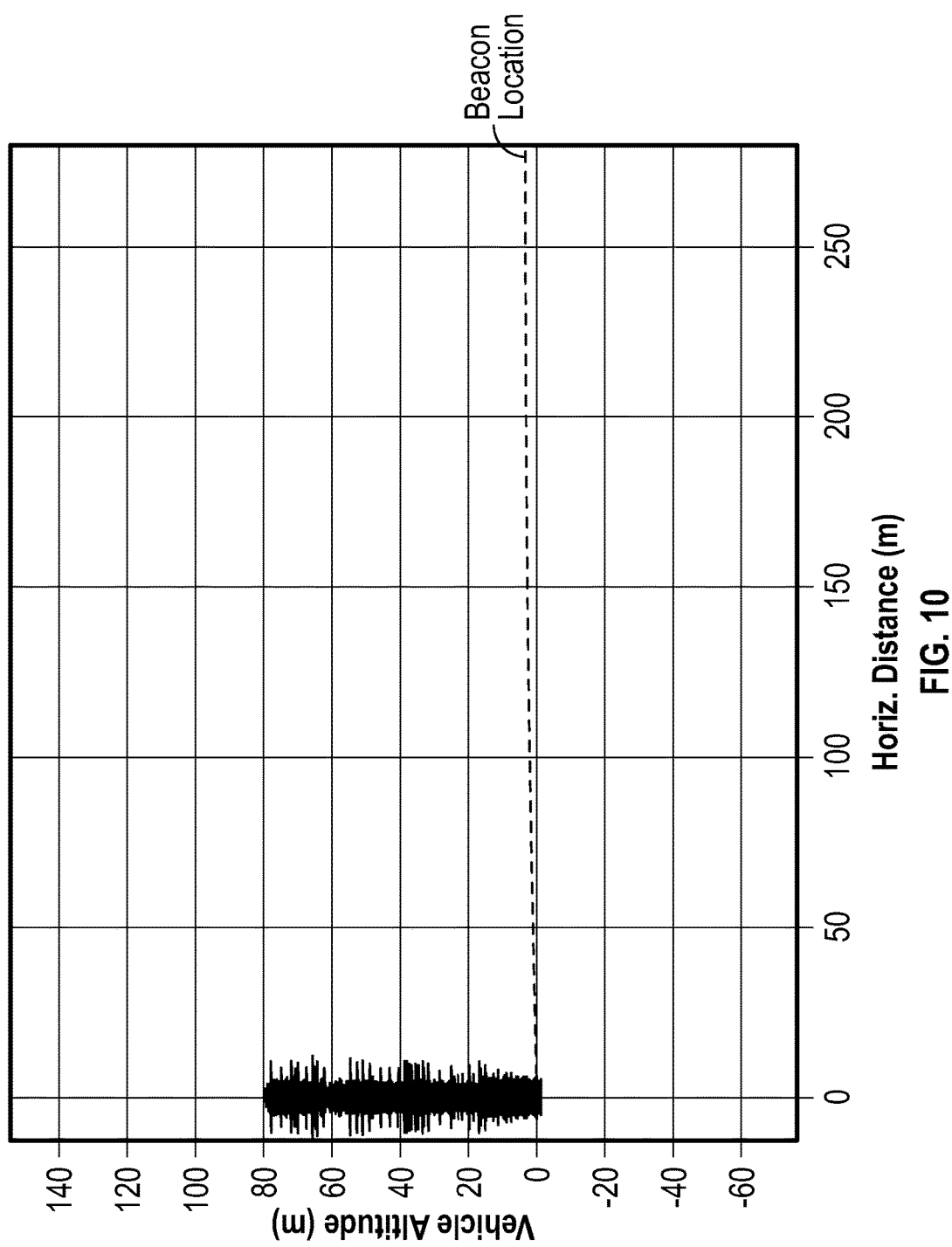
FIG. 10 is a chart showing the relationship between the altitude of an implementation of a UAV and the strength of the signals received when the beacon is placed 275 meters from the UAV.

Referring to FIG. 10, a chart showing the relationship between the altitude of an implementation of a UAV and the strength of the VHF signals received when the beacon is placed 275 meters from the UAV is shown. Similar to the chart in FIG. 9, at and near ground level there are no audible signals as any signals are lost in the noise. At between 10-20 meters, a few pulses become audible, and at about 30 meters, the pulses become clear and consistent. The dead spot at 60 meters is indicative of the audio cutting out. This chart, like chart 9, illustrates the increase in VHF signal quality as the receiver increases in altitude.

There are a variety of methods used to use a UAV to detect and monitor wildlife. In one implementation, which may be referred to as the pop-up bearing estimates, a radio system used by a field technician on the ground is coupled to the UAV. In this method, the UAV radio telemetry system may fly up to a prescribed altitude and then rotate in place. As the vehicle rotates, a high gain directional antenna may be used to receive the radio signals. The compass bearing where the antenna receives the strongest signal would typically be attributed to the expected direction of the tag. Alternatively, a null search could be conducted, wherein the direction of the tag is related to the low gain direction of the antenna. In either case, the vehicle may be spun in order to determine the radio source compass bearing relative to the vehicle location. By conducting this search method at disparate locations, triangulation may be used to determine the location, not just directional bearing, of the radio source.

In an alternative method, which may be referred to as the fly-over precision localization, an omnidirectional antenna may be coupled to the UAV and the UAV may be flown with the antenna pointing toward the ground. These antennas may have little to no reception capacity in the direction emanating along the length of the antenna. By orienting the antenna perpendicular to the ground when flown, if the vehicle flies over the tag, the received radio signal will momentarily disappear or drop significantly in strength. This reception phenomenon may be leveraged with regular or irregular flight patterns over an area wherein the radio source is thought to be located. As the search area is flown, the operator or signal processing algorithms may listen for drops in received signal strength as an indication of radio source position. These drops indicate when the UAV has flown over the VHF tag itself.

In various methods, the user may play a greater role in the method of detecting and monitoring wildlife. The radio environment created by these low powered radio transmitters is quite complex as it varies in 3D space and is affected by reflections, surface roughness, etc. As a result, searches for these beacons is often considered an art. Proficient radio trackers may be able to digest multiple variables in a way that an automated search algorithm would likely struggle. For example, a proficient tracker will use knowledge of local topography to distinguish a reflected signal from the true signal when the directional antenna receives more than one. This ability to overlay understandings of radio propagation, topography, environmental effects, and in the case of wildlife tracking, animal behavior, may be difficult to recreate in software. High dimensional radio data may be processed by software to provide the users with improved and richer datasets then the simple radio pulse intensity commonly used for signal detection. Also, in various implementations, the user will still interpret the received data signals to verify that the computer is properly calculating position and bearing.

Various system implementations may allow users to more accurately detect and monitor wildlife. For example, the popup flight bearing search method could autonomously estimate multiple likely bearing directions based on signal strength, and then present these to the user for down selection and comparison to other known factors such as local topology or animal behaviors. The fly-over precision localization search method could not only provide the standard audible feedback of signal strength, but also a visual representation of the data, such as a heat map, that overlays radio reception data on a map of the area to help the user understand and consolidate the multiple variables that may be affecting the received signals. The 3D radio environment capacity could be used to provide the users with a more complete picture of how the received signals are propagating in space, which may indicate directions or areas where the search could be moved to or focused. It may also help the user identify areas in the geography that are reflecting the signals and which need to be taken into account in the location calculations.

Historically users have relied on a single bit of information, the volume of the received radio pulse, to conduct their tracking. This system may provide a wide variety of more comprehensive data that will assist the user in monitoring wildlife. The decision making by the users, based on processed data, could be used as an intermediate stage of semi-automated search methods deployed on the UAV radio telemetry system.

In places where the description above refers to particular implementations of UAV wildlife detection and monitoring systems, UAVs, and implementing components, sub-components, methods and sub-methods, it should be readily apparent that a number of modifications may be made without departing from the spirit thereof and that these implementations, implementing components, sub-components, methods and sub-methods may be applied to other wildlife detection and monitoring systems.

What is claimed is:

1. An unmanned aerial vehicle (UAV) wildlife monitoring system comprising:
   a ground control station wirelessly coupled to a UAV, the UAV comprising a flight controller, a first radio, a second radio, a first antenna, a second antenna, a radio receiver, and a computer, all operatively coupled together; and
   a tag configured to be coupled to an animal;
   wherein when the tag is coupled to the animal, the radio receiver receives a radio signal from the tag using the first antenna;

wherein the computer generates location data from the radio signal received by the radio receiver, processes the location data, and sends the location data to the second radio;

wherein the second radio transmits the location data into a telecommunications channel;

wherein the ground control station receives the location data from the telecommunications channel; and wherein the ground control station is configured to one of log and display on a screen associated with the ground control station the location data of the animal.

2. The monitoring system of claim 1 further comprising a remote controller, wherein the flight controller receives flight commands from the remote controller received through the second antenna.

3. The monitoring system of claim 2, wherein the flight controller sends flight data relating to a flight path of the UAV to the first radio, wherein the first radio transmits the flight data to the ground control station.

4. The monitoring system of claim 1, wherein the computer receives flight data relating to a flight path of the UAV from the flight controller.

5. The monitoring system of claim 1, wherein the UAV is configured to adapt a flight path autonomously based on the radio signal received.

6. The monitoring system of claim 1, wherein the radio receiver is configured to combine multiple radio pulses received from the tag to improve a signal-to-noise ratio of the radio signal from the tag.

7. The monitoring system of claim 1, wherein the radio receiver is configured to create a map of one of strengths of signals received and of geographical range of signals received from the tag.

8. An unmanned aerial vehicle (UAV) wildlife monitoring system comprising:

a ground control station wirelessly coupled to a UAV, the UAV comprising a flight controller, a first radio, a second radio, a first antenna, a second antenna, a software defined radio receiver, a low noise amplifier, and a computer, all operatively coupled together; and a tag configured to be coupled to an animal;

wherein when the tag is coupled to the animal, the software defined radio receiver receives a radio signal from the tag using the first antenna and amplified by the low noise amplifier;

wherein the computer generates location data from the radio signal received by the software defined radio receiver, processes the location data, and sends the location data to the second radio;

wherein the second radio transmits the location data into a telecommunications channel;

wherein the ground control station receives the location data from the telecommunications channel; and wherein the ground control station is configured to one of log and display on a screen associated with the ground control station the location data of the animal.

9. The monitoring system of claim 8, wherein the computer receives flight data relating to a flight path of the UAV from the flight controller.

10. The monitoring system of claim 8, wherein the UAV is configured to adapt a flight path autonomously based on the radio signal received.

11. The monitoring system of claim 8, wherein the software defined radio receiver is configured to combine multiple radio pulses received from the tag to improve a signal-to-noise ratio of the radio signal from the tag.

12. The monitoring system of claim 8, wherein the software defined radio receiver is configured to create a map of one of strengths of signals received and of geographical range of signals received from the tag.

13. The monitoring system of claim 8, wherein the software defined radio receiver is configured to simultaneously detect and monitor multiple tags, each coupled to a different animal.

14. An unmanned aerial vehicle (UAV) wildlife monitoring system comprising:

a ground control station wirelessly coupled to a UAV, the UAV comprising a flight controller, a first radio, a second radio, a first antenna, a second antenna, a software defined radio receiver, a low noise amplifier, and a computer, all operatively coupled together; and a tag configured to be coupled to an animal;

wherein the software defined radio receiver is configured to simultaneously detect and monitor multiple tags, each coupled to a different animal;

wherein when the tag is coupled to the animal, the software defined radio receiver receives a radio signal from the tag using the first antenna and amplified by the low noise amplifier;

wherein the computer generates location data from the radio signal received by the software defined radio receiver, processes the location data, and sends the location data to the second radio;

wherein the second radio transmits the location data into a telecommunications channel;

wherein the ground control station receives the location data from the telecommunications channel; and wherein the ground control station is configured to one of log and display on a screen associated with the ground control station the location data of the animal.

15. The monitoring system of claim 14, wherein the UAV is configured to adapt a flight path autonomously based on the radio signal received.

16. The monitoring system of claim 14, wherein the software defined radio receiver is configured to combine multiple radio pulses received from the tag to improve a signal-to-noise ratio of the radio signal from the tag.

17. The monitoring system of claim 14, wherein the software defined radio receiver is configured to create a map of one of strengths of signals received and of geographical range of signals received from the tag.

18. The monitoring system of claim 14, further comprising a remote controller, wherein the flight controller receives flight commands from the remote controller received by the second antenna.

19. The monitoring system of claim 18, wherein the flight controller sends flight data relating to a flight path of the UAV to a first radio, wherein the first radio transmits the flight data to the ground control station.

20. The monitoring system of claim 14, wherein the computer receives flight data relating to a flight path of the UAV from the flight controller.

* * * * *